UNITED STATES PATENT OFFICE.

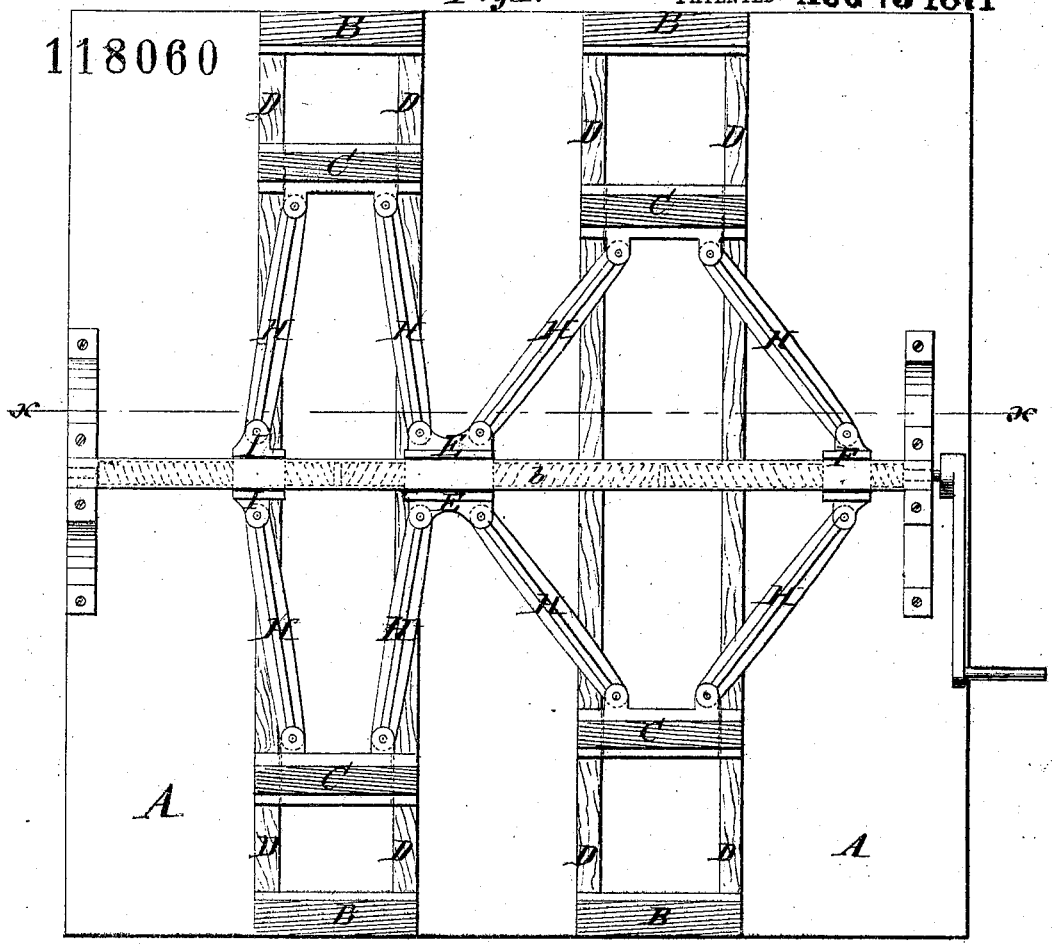
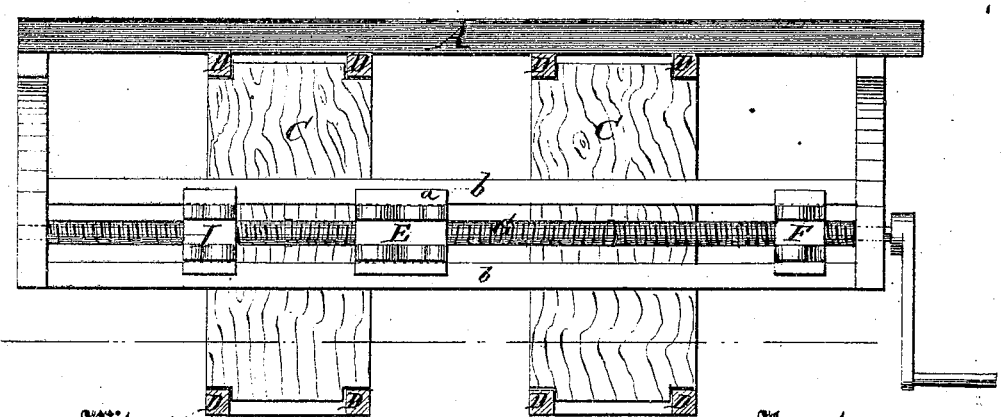

JOHN SCHLEY, OF SAVANNAH, GEORGIA.

IMPROVEMENT IN COTTON-PRESSES.

Specification forming part of Letters Patent No. 118,060, dated August 15, 1871.

*To all whom it may concern:*

Be it known that I, JOHN SCHLEY, of Savannah, in the county of Chatham and State of Georgia, have invented new and useful Improvements in Cotton-Presses; and I do hereby declare that the following is a full, clear, and exact description thereof, which will enable others skilled in the art to make and use the same, reference being had to the accompanying drawing forming part of this specification.

This invention relates to improvements in cotton-presses; and it consists in one or more gangs, comprising two presses, with vertical followers working horizontally toward and from an operating-shaft on opposite sides of it, and with vertical press-boards, the said followers being operated by right-and-left-threaded nuts on the said operating-shaft, which is correspondingly threaded, to which nuts they are connected by knuckle-jointed arms in a manner to provide a cheaply-constructed apparatus, which, being worked by power, and when two gangs are used being so arranged that the presses of one gang open while the others close, is calculated to turn off the work very rapidly, affording continuous employment for the attendants in attending to one gang while the other is in the condition not to require attendance.

Figure 1 is a plan view of my improved press, comprising two gangs of presses, and Fig. 2 is a sectional elevation on the line *x x*.

On a platform or bed-frame, A, of any suitable kind, I erect two permanent vertical press-boards, B, at opposite sides, facing each other, and arrange a follower, C, for each, on guides D, to move toward and from the said press-boards for pressing the cotton against them. These followers I connect to the nuts E F, on the right-and-left screw-threaded shaft G arranged between them, by the arms H, which are knuckle or toggle-jointed to the followers and to the nuts, as shown, so that the same nuts actuate the two followers of one gang of presses in such a way that the resistance on the nuts at one side is balanced by that of the other, and cramping or binding is avoided.

The shaft is to be operated by any competent power, being turned in one direction for retracting the followers and the other way for pressings. When I employ two of these gangs in one machine I connect one set of arms, H, of each gang to the nut E, and arrange the thread of the shaft which operates nut I on the same hand that the thread for the nut F is, which (both these parts turning opposite to the thread for nut E) causes the presses of one gang to open when the others close, and vice versa, thereby making the resistance to the power equal or nearly so at all times, and providing a continuously-working machine, in which the attention of the attendants will be alternately directed to each gang, as required by the progress of the operation.

The nuts are fitted between guides *b*, and have flanges *a* lapping the sides thereof to keep them in proper control in operation.

Having thus described my invention, I claim as new and desire to secure by Letters Patent—

The arrangement, in the cotton-press herein described, of the two pairs of followers C C and guides D D, the four pairs of toggle-arms H H, the nuts F I, double nut E, guides *b b*, and the right-and-left screw G, as and for the purpose shown and described.

JOHN SCHLEY.

Witnesses:
   GEORGE W. MABEE,
   T. B. MOSHER.